United States Patent [19]
Borchard

[11] Patent Number: 5,150,759
[45] Date of Patent: Sep. 29, 1992

[54] CAPACITOR-SENSOR

[76] Inventor: John S. Borchard, 97-A Lowell Ave., Newton, Mass. 02160

[21] Appl. No.: 604,174

[22] Filed: Oct. 29, 1990

[51] Int. Cl.[5] .......................... G01G 3/14; H01G 7/00; G01L 9/12; G01L 1/26
[52] U.S. Cl. ................................ 177/210 C; 361/283; 73/718; 73/862.52
[58] Field of Search ..................... 177/210 C; 361/283; 73/718, 862.52

[56] References Cited

U.S. PATENT DOCUMENTS

| | | | |
|---|---|---|---|
| 4,064,550 | 12/1977 | Dias et al. | 361/283 |
| 4,182,187 | 1/1980 | Hanson | 177/210 C X |
| 4,207,604 | 6/1980 | Bell | 361/283 |
| 4,679,643 | 7/1987 | Bove | 177/210 C |
| 4,705,127 | 11/1987 | Kunz | 177/210 C X |
| 5,001,595 | 3/1991 | Dittrich et al. | 361/283 |
| 5,006,952 | 4/1991 | Thomas | 361/283 |
| 5,044,202 | 9/1991 | Southworth et al. | 361/283 X |
| 5,050,034 | 9/1991 | Hegner et al. | 361/283 |

Primary Examiner—George H. Miller, Jr.
Attorney, Agent, or Firm—John P. McGonagle

[57] ABSTRACT

An improved capacitor-sensor formed between two rigid, closely-spaced and facing, first and second plates, each with a facing and nonfacing surface and with specific facing electrode patterns on the plates forming a plurality of capacitors sensitive to displacement between the plates, which will eliminate asymmetrical overlap patterns and horizontal motion sensitivity. The first and second plate electrode patterns each have three, equispaced, identical, circular conductive regions on their facing surfaces. The diameters of the first plate circular conductive regions are less than the diameters of the circular conductive regions of the second plate. Electrical leads and interconnections are so arranged that overlap between leads and interconnections on opposing plates is avoided.

30 Claims, 4 Drawing Sheets

CAPACITOR-SENSOR

BACKGROUND OF THE INVENTION

The present invention relates to capacitor-sensors and, more particularly, to improvements in capacitors formed from patterned electrodes.

The present invention is related to self-adjusting weighing systems for measuring gems and other very light masses and, more particularly, to the system described in my U.S. Pat. No. 4,738,324, entitled "Self-Adjusting Weighing System" issued Apr. 19, 1988 (hereafter '324 patent). This patent is incorporated by reference herein.

There are many ways to measure weight. For top-loading balances, where the mass to be weighed is placed on top of a pan, a common problem is that of off-center pan loading in which the mass to be weighed is not located at the exact center of the weighing pan, but is off to one side. In general, when a load is placed deviatedly from the required point of placement, such as the center of the pan, the bending moment exerted on the pan thereby produces an error in the measured value.

The '324 patent cited above discloses an apparatus for dealing with the problem of off-center pan loading. The apparatus technique is a self-adjusting one in which the effects of off-center loading in the load cell are measured and corrected before the weight reading is outputted. The device disclosed in said patent measures deflection at a plurality of locations on a spring-supported pan, and combines these separate measurements to yield the weight on the pan, corrected for load placement location, i.e., off-center loading. The deflection measurements are accomplished using a plurality of capacitor-sensors formed between two rigid, closely-spaced plates with specific electrode patterns on the plates forming the capacitors. These are not actually three physically separate capacitors, but one device acting like three different capacitors and/or performing as if it were three separate capacitors. The plates are attached to the weight bearing pan and a base. The plates are held apart by three or more springs spaced around the periphery of the plates. The measurements are electronically gathered as measured values for each capacitor.

The capacitor-sensor arrangement used in the '324 patent is illustrated in FIG. 1. The capacitor-sensor has a top plate and a bottom plate. The bottom plate is made of nonconductive material, e.g., ceramic, but has a specific pattern of conductive material silk screened onto its upper surface, consisting of three, separate, symmetrical, roughly one hundred twenty degree, pie-shaped regions. The top plate is also made of nonconductive material. Its undersurface has a solid, three hundred sixty degree conductive region silk screened on. In effect, the two plates form three, pie-shaped capacitor-sensors. The electrical leads for the three pie-shaped regions are brought out between regions #1 and #3 of the lower plate to a point at the circumference of the lower plate. The leaf springs translate the weight of the object being measured into displacement between the plates. The three capacitors formed are employed as sensors in which the weight applied against the sensor affects a change of capacitance which is converted by conventional electronics to a frequency inversely proportional to the capacitance. Thus, electrical outputs are obtainable which are analogs of the weight of the object being measured, the variation in values of the three capacitors reflecting tipping from the position of the object being measured on the pan as well as its weight. In the '324 apparatus perfect centering of the object to be measured on the top pan would mean nominally that the capacitance values for each of the capacitance regions would be the same. However, the slightest deviation from perfect nominal centering would mean that the capacitance values for each would be different. This was the basis for the '324 invention.

To accomplish the requirements of the '324 apparatus, the capacitor-sensors must reflect as directly as possible deviations from perfect centering of the mass to be measured. Because of the lightness of the masses to be measured, even a slight sensitivity of the capacitor-sensors to other factors could distort measurements.

It has been found that the capacitor-sensor configuration of the '324 patent (see FIG. 1) was sensitive to two factors not previously considered. One factor has to do with a contribution of capacitance due to the long lead from the circumference edge contact to the region #2 electrode area between regions #1 and #3. The effective electrode of region #2, therefore, was slightly different in shape and area from electrode regions #1 and #3. This asymmetry has caused problems in linearizing the weight output and correcting for side-to-side errors in the weight output.

The second factor has to do with horizontal motion sensitivity. The bottom plate in the '324 apparatus is fixed. However, the top plate may move laterally to some extent. An example of this would be if the scale is not level and horizontal. During the weighing operation there will be a resultant lateral motion between the upper and bottom electrodes to which sensitivity is not desirable. The result of the lateral movement on capacitance is that it affects the capacitance area, i.e., the resultant area between two electrodes, and changes the capacitance before factors such as distance between electrodes is considered.

SUMMARY OF THE INVENTION

In view of the foregoing disadvantages inherent in the known types of devices now present in the prior art, the present invention provides an improved capacitor-sensor. As such, the general purpose of the present invention, which will be described subsequently in greater detail, is to provide a new and improved capacitor-sensor formed between two rigid, closely-spaced and facing, upper and bottom plates, each with an upper and lower surface and with specific facing electrode patterns on the plates forming a plurality of capacitors sensitive to displacement between the plates, which will eliminate asymmetrical overlap patterns and horizontal motion sensitivity.

To attain this, the present invention replaces the pie-shaped conductor arrangement of the '324 bottom capacitor-sensor with three, equispaced, identical, circular conductive regions on the upper surface of the bottom plate. The solid, three hundred sixty degree conductive region on the lower surface of the upper plate is replaced with three, equispaced, identical, circular conductive regions. The diameter of the upper plate circular conductive regions is less than the diameter of the circular conductive regions of the bottom plate. The electrical connector layout of the bottom plate is similar to the '324 layout. The electrical connector layout of the upper plate is different in that the conductive regions are interconnected.

The result of the present invention capacitor-sensor layout is that the bottom plate region #2 connector lead has no overlap with any conductive area on the upper plate. Asymmetrical capacitance effects from lead overlap are thereby eliminated. By making the upper plate electrode pattern a subset of the bottom plate electrode pattern, the resultant capacitance is unaffected by lateral motion since the lateral motion is not sufficient to move the upper electrode pattern outside of the area covered by the lower electrode pattern.

In summary, the present invention is an improved capacitor-sensor formed between two rigid, closely-spaced and facing, first and second plates, each with a facing surface and with one or more electrode patterns on each facing surface thereby forming one or more capacitors sensitive to displacement between the plates. Electrical leads and interconnections are so arranged that overlap between leads and interconnections on opposing plates is avoided.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE PREFERRED EMBODIMENT

Figure 1:
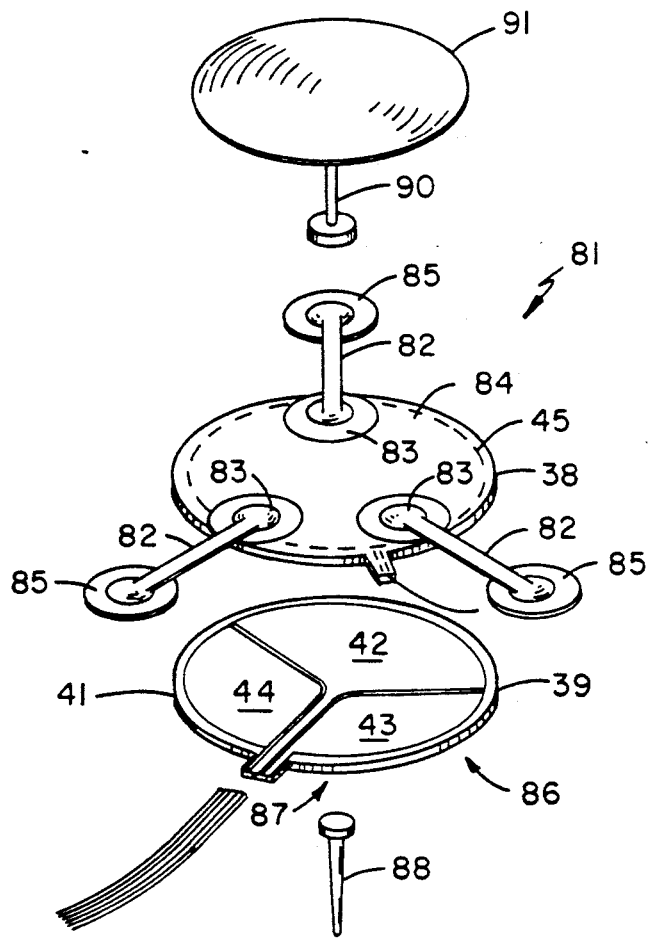
FIG. 1 is a perspective exploded view of an embodiment of a pan and sensor assembly using a capacitor-sensor of the type addressed by the present invention.
Figure 2:
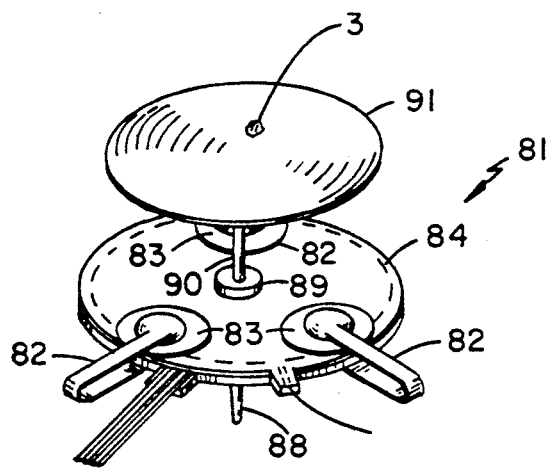
FIG. 2 is a perspective view of the pan and sensor assembly of FIG. 1 assembled.

Referring to the drawings in detail wherein like elements are indicated by like numerals, there is shown in FIGS. 1 and 2 an embodiment of a weighing system pan and sensor assembly utilizing a capacitor-sensor of the type addressed by the present invention.

This embodiment 81 uses three leaf springs 82 directly interconnecting the capacitor plates 38 and 39. One end 83 of each spring 82 is fixedly attached to the upper face 84 of the top capacitor plate 38, and the other end 85 of each spring 82 is fixedly attached to the bottom face 86 of the bottom capacitor plate 39. Extending vertically downward from the center 87 of the bottom face 86 of the bottom capacitor plate 39 is a rigid member 88, one end of which is fixedly attached to said center 87 and the other end of which is fixedly attached to the casing bottom (not shown) of the weighing system. Extending vertically upward from the center 89 of the upper face 84 of the top plate 38 is another rigid member 90, one end of which is fixedly attached to said center 89, and the other end of which is fixedly and centrally attached to a shallow pan 91 lying in a plane parallel to the planes of the plates 38 and 39. When the item 3 being weighed is placed on the pan 91, any off-center placement of the item 3 will be translated through the member 90 to the top plate 38, not only as a downward force, but also as a tipping force. The bottom plate 39 provides a flat, rigid plane of reference for the tipping movement of the top plate 38. The bottom plate 39 is made of nonconductive material, such as ceramic, but has a specific pattern of conductive material silk screened onto its unattached side 41, consisting of three, separate, symmetrical, roughly one hundred twenty degree, pie-shaped regions 42, 43, and 44. See also FIG. 3A. The top plate 38 is also made of a nonconductive material, such as ceramic. Its unattached side 40 has a solid, three hundred sixty degree conductive region 45 silk screened on. See also FIG. 3B which is a view of the conductive region 45 through the attached side 84 of the top plate ceramic.

Figure 3A:
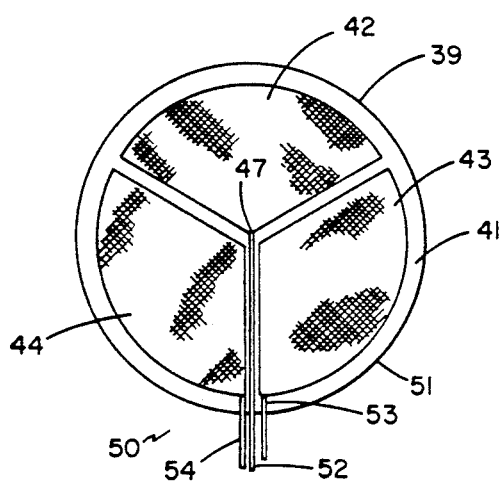
FIGS. 3A and 3B show plan views of the conductive regions of the lower and upper plates respectively of the capacitor-sensor of FIGS. 1 and 2.

As may be most clearly seen from FIG. 3A, the lead 52 from electrode region #2 42 extends from the interior point 47 of region #2 42 travels between region #1 43 and region #3 44 to a lead junction area 50 at the circumference 51 of the bottom plate 39. The leads 53 and 54 from regions #1 and #3 begin nearly at the circumference 51 of the lead junction area 50. As may be most readily understood from FIG. 3B viewed in conjunction with FIG. 3A a capacitance will be formed between the lead 52 and the upper plate electrode region 45 because capacitance is formed whenever there is an overlap between two electrodes. The effect of this is to increase the capacitance area of region #2 42, thereby creating an asymmetrical capacitance effect among the three regions 42, 43, and 44.

Just as a capacitance will be formed where there is an overlap between two electrodes, capacitance will decrease when the overlap between two electrodes decreases. The upper plate 38 and lower plate 39 form three capacitors between them, i.e., 42-45, 43-45, and 44-45. When the upper plate 38 tips due to the non-center placement of an item 3 to be weighed, there is also some horizontal movement of the upper plate 38 relative to the bottom plate 39. If the upper plate 38 moves horizontally, the overlap between the upper plate electrode 45 and the three bottom plate electrodes 42, 43, and 44 will change, independently of tipping. The changes in capacitance among the three capacitors 42-45, 43-45, and 44-45 will generally not be the same, thereby introducing a source of error into the measurements due to horizontal motion.

Figure 4A:
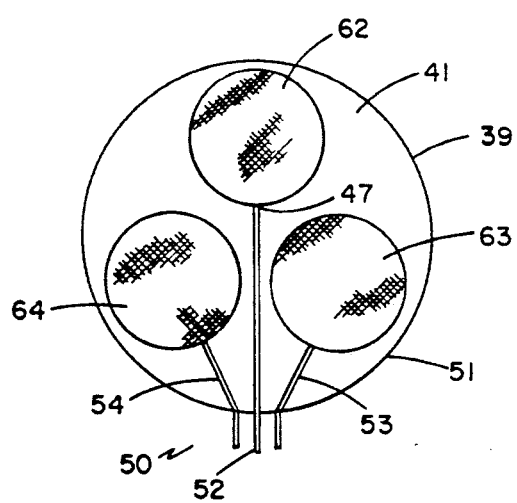
FIGS. 4A and 4B show plan views of the conductive regions of the lower and upper plates respectively of the improved capacitor-sensor of the present invention.
Figure 4B:
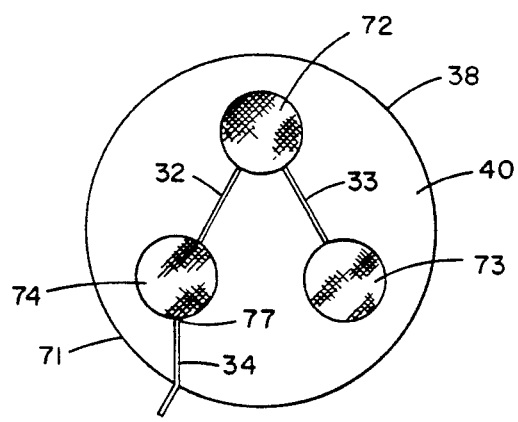
Figure 5:
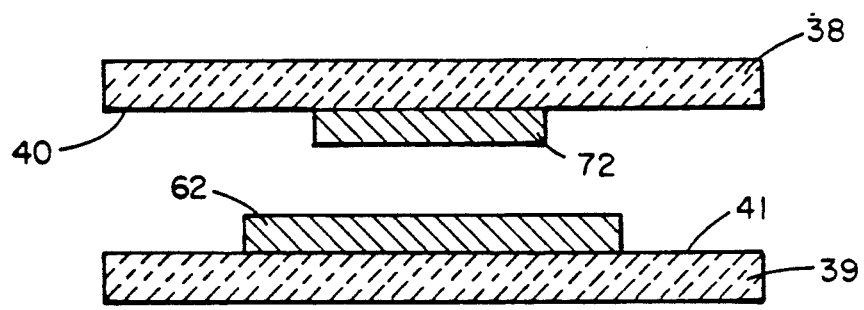
FIG. 5 shows in cross-section an upper plate conductive region over a lower plate conductive region.

FIGS. 4A, 4B and 5 illustrate the present invention design which eliminates the problems of asymmetrical overlap patterns and horizontal motion sensitivity. FIG. 4A is a plan view of the conductive regions on the upper surface 41 of the bottom plate 39. The pie-shaped regions 42, 43 and 44 of FIG. 3A have been replaced with three, equispaced, identical, circular conductive regions 62, 63, and 64 on the upper surface 41 of the bottom capacitor plate 39. As with the regions of FIG. 3A, the region #2 lead 52 extends from the inner most region #2 circumference point 47 between region #1 63 and region #3 64 to the lead junction area 50 at the circumference 51 of the bottom plate 39. The leads 53 and 54 from region #1 63 and region #3 64 extend directly from said regions to the lead junction area 50.

Figure 3B:
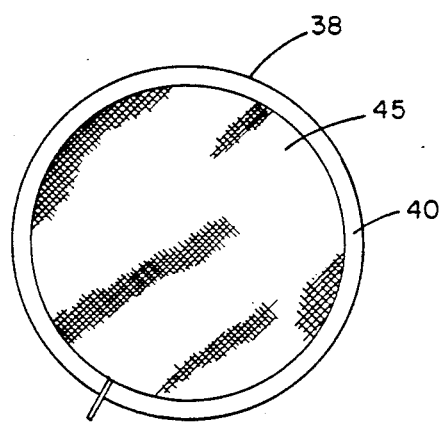

The three hundred sixty degree conductive area 45 of the undersurface 40 of the top capacitor plate 38 illustrated in FIG. 3B is replaced with three, equispaced, identical, circular conductive regions 72, 73, and 74 on the lower surface 40 of the top capacitor plate 38. See FIG. 4B which is a view of the conductive regions 72, 73, and 74 through the attached side 84 of the top plate ceramic. A lead 33 interconnects region #1 73 with region #2 72 at their closest circumferential points. A lead 32 interconnects region #2 72 with region #3 74 at their closest circumferential points. A lead 34 extends from region #3 at circumferential point 77 to the top plate circumference 71 at a point on either side of the circumferential arc directly above said bottom plate lead junction area 50 when the two plates 38 and 39 are aligned one over the other. The regions 63, 62, 64 and 73, 72, 74 are aligned facing each other with the central points of regions 63, 73 and 62, 72 and 64, 74 concentrically aligned to form capacitances 63-73, 62-72, and 64-74. As may also be seen from FIG. 5 the diameters of the top plate electrode regions 72, 73 and 74 are less than the diameters of the bottom plate electrode regions 62, 63 and 64.

When the plates 38 and 39 are assembled one over another so that the top plate undersurface 40 faces the bottom plate upper surface 41, the central points of the upper electrode regions 72, 73 and 74 are perfectly aligned with the central points of the bottom plate electrode regions 62, 63 and 64. There are no overlaps between the leads 32, 33 and 34 of the upper electrode regions 72, 73 and 74 and the leads 52, 53 and 54 of the lower electrode regions 62, 63 and 64. Therefore, asymmetrical overlap patterns are eliminated. Even with horizontal movement, the circumferences of the upper plate electrode regions 72, 73 and 74 do not extend horizontally past the outer circumferences of the lower plate electrode regions 62, 63 and 64 over which they are initially aligned. Horizontal motion sensitivity is thereby eliminated.

Figure 6:
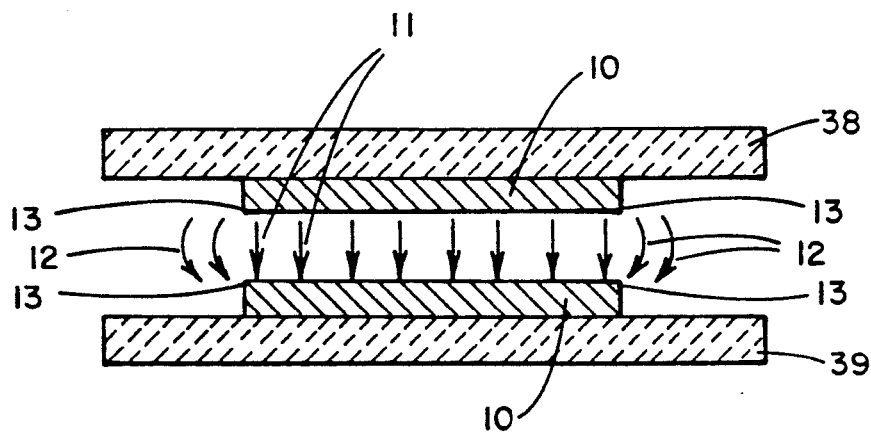
FIG. 6 shows in cross-section the electric field between two conductive regions.

FIG. 6 illustrates another asymmetrical effect from the use of prior art capacitor-sensors. Not only is the capacitance between conductive regions 10 composed of a simple parallel-plate effect 11, but there is also a nonlinear edge effect 12, in which the electric field between the two conductive regions 10 curves outward at the edge 13 of the conductor areas 10, thereby creating additional capacitance. This is partly caused by a natural increase in the electric field in the neighborhood of any point or edge, and the edge 13 of the conductor area 10 is one such edge. Although this problem is partly alleviated by making the circumference of one electrode a subset of the other, there is still some asymmetry. The present invention reduces this effect by spreading the "edge effect" over a bigger area.

Figure 7:
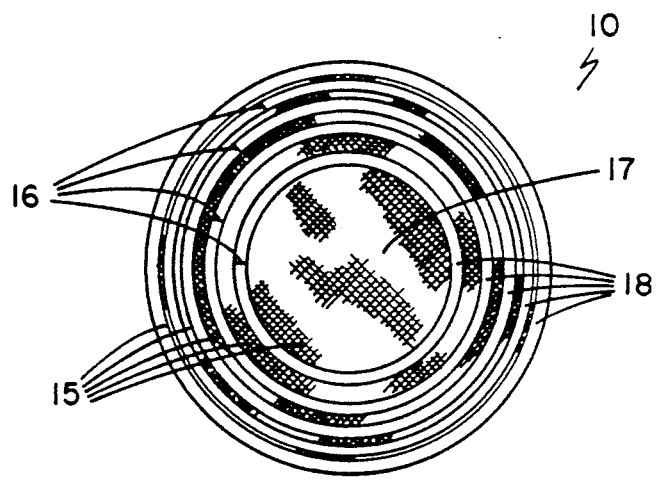
FIG. 7 shows a plan view of a concentric ring conductive region.

There are three approaches taken by the instant invention in creating the edge effect "all over" and thereby eliminating the effect at only some locations. In the first approach as shown in FIG. 7, a single region 10 is broken into a plurality of concentric conductive rings 15 of decreasing width, effectively decreasing the percentage coverage of the non-conductive plate ceramic 18 as a function of distance from the center 17. The rings 15 are interconnected electrically by narrow lines 16 of conductor 10 staggered in their locations to minimize the asymmetrical effects on the sensor. A concentric ring region 10 is substituted for each of the regions 72, 73, 74, of FIGS. 4B. Overall dimensions and electrical connections 32, 33, and 34 remain the same.

Figure 8:
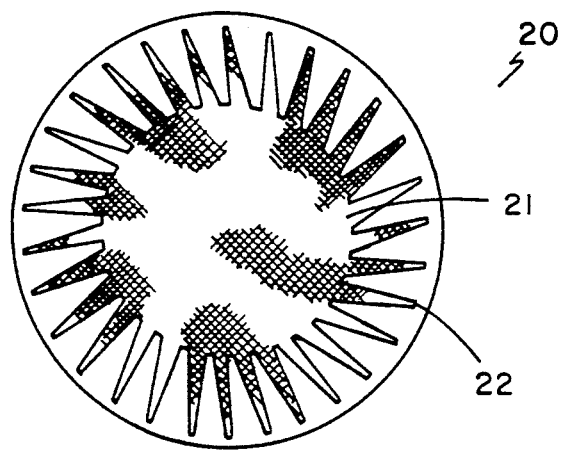
FIG. 8 shows in plan view a radially patterned conductive region.

In the second approach taken by the instant invention to create the edge effect "all over" and thereby eliminate the effect at only some locations is to use a radially patterned region 20 instead of the concentric ring patterned region 10 described above. As illustrated in FIG. 8, the region 20 has a center electrode portion 21 and a plurality of identical, elongated conductor elements 22 radiating outward from the center electrode portion 21. In this embodiment of the invention thirty elements 22 were used. The shape of the elements 22 is not critical provided that they are elongated and identical. A radially patterned region 20 is substituted for each of the regions 72, 73, and 74 of FIG. 4B. Overall dimensions and electrical connections 32, 33, and 34 remain the same.

Figure 9:
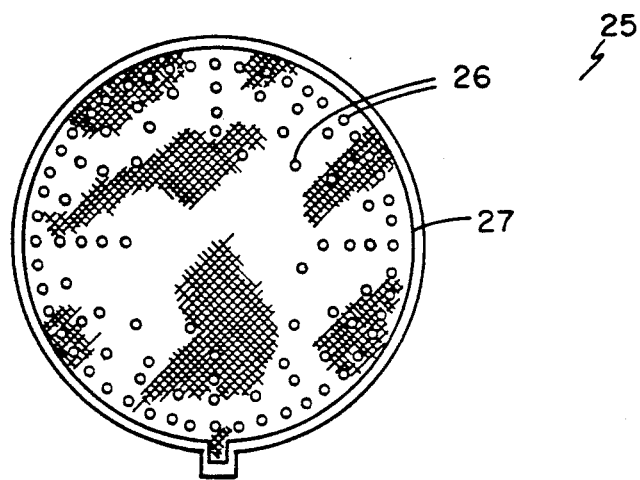
FIG. 9 shows in plain view a spot patterned conductive region.

In the third approach taken by the instant invention to create the edge effect "all over" and thereby eliminate the effect at only some locations is to use a spot patterned region 25 instead of the concentric ring patterned region 10 or radially patterned region 20 described above. As illustrated in FIG. 9, the region 25 has a basic conductive pattern similar to those regions 62, 63, 64, 72, 73 and 74 shown in FIGS. 4A and 4B. However, regular or random conductive spots 26 are removed from the region in a density increasing toward the edge 27, until as the edge 27 is reached there is a very little coverage. The resultant non-conductive spots 26 are so formed in the region 25 so that electrical connection remains between and among the remaining conductor material. A spot patterned region 25 is substituted for each of the regions 72, 73, and 74 of FIG. 4B. Overall dimensions and electrical connections 32, 33, and 34 remain the same.

It is understood that the above-described embodiment is merely illustrative of the application. Other embodiments may be readily devised by those skilled in the art which will embody the principles of the invention and fall within the spirit and scope thereof. For example, one, two, four or more electrical regions could be used in place of the three regions in the preferred embodiment. The above principles would also be equally applicable to single capacitors. The designation of upper plate and lower plate in the above description could also be easily interchanged depending upon the capacitance application. Instead of the lead structure illustrated in FIGS. 4A and 4B, one or more feedthrough holes could be formed in the bottom plate 39 adjacent to each of the conductive regions 62, 63 and 64. Each lead 52, 53 and 54 would be passed directly through its respective feedthrough hole to the plate's nonfacing attached side 86. A feedthrough hole would also be formed in the top plate 38 adjacent to one of the conductive regions 72, 73 or 74. An electrical lead 32, 33 or 34 would be passed through the feedthrough hole to the top plate upper face 84. In either case, the electrical leads and interconnections would be so arranged that overlap between leads and interconnections would be avoided.

I claim:

1. An improved capacitor-sensor formed between two rigid, closely-spaced and facing, first and second plates, each with a perimeter, facing and nonfacing surface and with specific electrode patterns on each facing surface thereby forming a plurality of capacitors sensitive to displacement between the plates, comprising:
- a plurality of separate conductive regions on the facing surface of the second plate;
- a plurality of separate conductive regions on the facing surface of the first plate, corresponding to and facing the second plate conductive regions; and
- wherein one of each corresponding regions is a subset of the other.

2. An improved capacitor-sensor as recited in claim 1 wherein:
- an electrical lead extends from each conductive region on the second plate to the perimeter of said second plate; and
- each conductive region of the first plate is electrically interconnected.

3. An improved capacitor-sensor as recited in claim 2 wherein the electrical leads and interconnections are so arranged that overlap between leads and interconnections on opposing plates is avoided.

4. An improved capacitor-sensor as recited in claim 3 wherein:
- said second plate conductive regions are identical and equispaced about said plate facing surface; and
- said first plate conductive regions are identical and equispaced about said plate facing surface.

5. An improved capacitor-sensor as recited in claim 4 wherein said conductive regions are circular.

6. An improved capacitor-sensor as recited in claim 5 wherein each said first plate conductive region is broken into a plurality of concentric, electrically conductive and interconnected rings.

7. An improved capacitor-sensor as recited in claim 6 wherein each said first plate conductive region has a center and said plurality of concentric rings have decreasing widths as each is positioned further from said center.

8. An improved capacitor-sensor as recited in claim 5 wherein each said first plate conductive region has a center electrode portion and a plurality of identical, elongated conductor elements radiating outward from said center electrode portion.

9. An improved capacitor-sensor as recited in claim 5 wherein each said first plate conductive region has conductive spot portions removed from the region in a density increasing toward the edge of said region.

10. An improved capacitor-sensor as recited in claim 9 wherein said non-conductive spots are so formed in said region that electrical connection remains between and among the remaining conductor material.

11. An improved capacitor-sensor as recited in claim 1 wherein said second plate contains one or more feedthrough holes through which electrical leads from said conductive regions may be passed to the nonfacing surface of said second plate.

12. An improved capacitor-sensor as recited in claim 11 wherein:
- each conductive region of the first plate is electrically interconnected, and
- said first plate contains a feedthrough hole through which an electrical lead is passed to the nonfacing surface of said first plate.

13. An improved capacitor-sensor as recited in claim 12 wherein the electrical leads and interconnections are so arranged that overlap between leads and interconnections on opposing plates is avoided.

14. An improved capacitor-sensor as recited in claim 13 wherein:
- said second plate conductive regions are identical and equispaced about said plate facing surface; and
- said first plate conductive regions are identical and equispaced about said plate facing surface.

15. An improved capacitor-sensor as recited in claim 14 wherein said conductive regions are circular.

16. An improved capacitor-sensor as recited in claim 15 wherein each said first plate conductive region is broken into a plurality of concentric, electrically conductive and interconnected rings.

17. An improved capacitor-sensor as recited in claim 16 wherein each said first plate conductive region has a center and said plurality of concentric rings have decreasing widths as each is positioned further from said center.

18. An improved capacitor-sensor as recited in claim 15 wherein each said first plate conductive region has a center electrode portion and a plurality of identical, elongated conductor elements radiating outward from said center electrode portion.

19. An improved capacitor-sensor as recited in claim 15 wherein each said first plate conductive region has conductive spot portions removed from the region in a density increasing toward the edge of said region.

20. An improved capacitor-sensor as recited in claim 19 wherein said non-conductive spots are so formed in said region that electrical connection remains between and among the remaining conductor material.

21. An improved capacitor-sensor formed between two rigid, closely-spaced and facing, first and second plates, each with a facing surface and with one or more electrode patterns on each facing surface thereby forming one or more capacitors sensitive to displacement between the plates, comprising:
- one or more separate conductive regions on the facing surface of the second plate;
- one or more separate conductive regions on the facing surface of the first plate, corresponding to and facing the second plate conductive regions, wherein each of said first plate conductive regions is broken into a plurality of concentric, electrically conductive and interconnected rings; and
- wherein one of each corresponding regions is a subset of the other.

22. An improved capacitor-sensor as recited in claim 21 wherein each of said first plate conductive regions has a center and said plurality of concentric rings have decreasing widths as each is positioned further from said center.

23. An improved capacitor-sensor formed between two rigid, closely-spaced and facing, first and second plates, each with a facing surface and with one or more electrode patterns on each facing surface thereby forming one or more capacitors sensitive to displacement between the plates, comprising:
- one or more separate conductive regions on the facing surface of the second plate;
- one or more separate conductive regions on the facing surface of the first plate, corresponding to and facing the second plate conductive regions, wherein each of said first plate conductive regions has a center electrode portion and a plurality of identical, elongated conductor elements radiating outward from said center electrode portion; and
- wherein one of each corresponding regions is a subset of the other.

24. An improved capacitor-sensor formed between two rigid, closely-spaced and facing, first and second plates, each with a facing surface and with one or more electrode patterns on each facing surface thereby forming one or more capacitors sensitive to displacement between the plates, comprising:
- one or more separate conductive regions on the facing surface of the second plate;
- one or more separate conductive regions on the facing surface of the first plate, corresponding to and facing the second plate conductive regions, wherein each of said first plate conductive regions has conductive spot portions removed from the region in a density increasing toward the edge of said region; and
- wherein one of each corresponding regions is a subset of the other.

25. An improved capacitor-sensor as recited in claim 24 wherein said non-conductive spots are so formed in said region that electrical connection remains between and among the remaining conductor material.

26. An improved capacitor-sensor formed between two rigid, closely-spaced and facing, first and second plates, each with a facing surface and with one or more electrode patterns on each facing surface thereby forming one or more capacitors sensitive to displacement between the plates, comprising:
- one or more separate conductive regions on the facing surface of the second plate;
- one or more separate conductive regions on the facing surface of the first plate, corresponding to and facing the second plate conductive regions; and
- wherein each of said conductive regions on at least one facing surface is broken into a plurality of concentric, electrically conductive rings with staggered electrical inter-ring connections.

27. An improved capacitor-sensor formed between two rigid, closely-spaced and facing, first and second plates, each with a facing surface and with one or more electrode patterns on each facing surface thereby forming one or more capacitors sensitive to displacement between the plates, comprising:
- one or more separate conductive regions on the facing surface of the second plate;
- one or more separate conductive regions on the facing surface of the first plate, corresponding to and facing the second plate conductive regions;
- wherein each of said conductive regions on at least one facing surface is broken into a plurality of concentric, electrically conductive and interconnected rings; and
- wherein each of said broken conductive regions has a center and said plurality of concentric rings have decreasing widths as each is positioned further from said center.

28. An improved capacitor-sensor formed between two rigid, closely-spaced and facing, first and second plates, each with a facing surface and with one or more electrode patterns on each facing surface thereby forming one or more capacitors sensitive to displacement between the plates, comprising:
- one or more separate conductive regions on the facing surface of the second plate;
- one or more separate conductive regions on the facing surface of the first plate, corresponding to and facing the second plate conductive regions; and
- wherein each of said conductive regions on at least one facing surface has a center electrode portion and a plurality of identical, elongated conductor elements radiating outward from said center electrode portion.

29. An improved capacitor-sensor formed between two rigid, closely-spaced and facing, first and second plates, each with a facing surface and with one or more electrode patterns on each facing surface thereby forming one or more capacitors sensitive to displacement between the plates, comprising:
- one or more separate conductive regions on the facing surface of the second plate;
- one or more separate conductive regions on the facing surface of the first plate, corresponding to and facing the second plate conductive regions; and
- wherein each of said conductive regions on at least one facing surface has conductive spot portions removed from the region in a density increasing toward the edge of said region.

30. An improved capacitor-sensor as recited in claim 29 wherein said non-conductive spots are so formed in said region that electrical connection remains between and among the remaining conductor material.

* * * * *